United States Patent
Frey et al.

(10) Patent No.: US 12,236,514 B2
(45) Date of Patent: Feb. 25, 2025

(54) EFFICIENTLY RENDERING VIDEO HAVING DYNAMIC COMPONENTS

(71) Applicant: Google LLC, Mountain View, CA (US)

(72) Inventors: Nathan James Frey, Los Angeles, CA (US); Zheng Sun, Sunnyvale, CA (US); Yifan Zou, Sunnyvale, CA (US); Sandor Miklos Szego, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/417,268

(22) PCT Filed: May 14, 2020

(86) PCT No.: PCT/US2020/032889
§ 371 (c)(1),
(2) Date: Jun. 22, 2021

(87) PCT Pub. No.: WO2021/230872
PCT Pub. Date: Nov. 18, 2021

(65) Prior Publication Data
US 2023/0058512 A1    Feb. 23, 2023

(51) Int. Cl.
*G06T 11/00* (2006.01)
*G06T 5/50* (2006.01)
(Continued)

(52) U.S. Cl.
CPC .............. *G06T 15/00* (2013.01); *G06T 5/50* (2013.01); *G06T 11/00* (2013.01); *H04N 19/46* (2014.11)

(58) Field of Classification Search
CPC .... G06T 11/00; H04N 19/46; H04N 21/8146; H04N 21/23439
See application file for complete search history.

(56) References Cited

U.S. PATENT DOCUMENTS

| 8,666,226 B1 | 3/2014 | Kalish et al. |
| 10,002,115 B1 | 6/2018 | Killian et al. |

(Continued)

FOREIGN PATENT DOCUMENTS

| CN | 105320662 | 2/2016 |
| CN | 107767437 | 3/2018 |

(Continued)

OTHER PUBLICATIONS

International Preliminary Report on Patentability in International Appln. No. PCT/US2020/032889, mailed on Nov. 24, 2022, 10 pages.

(Continued)

*Primary Examiner* — Ryan McCulley
(74) *Attorney, Agent, or Firm* — Fish & Richardson P.C.

(57) ABSTRACT

A method for efficient dynamic video rendering is described for certain implementations. The method may include identifying a file for rendering a video comprising one or more static layers and one or more dynamic layers, detecting, based on analyzing one or more fields of the file for rendering a video, the one or more static layers and the one or more dynamic layers, wherein each dynamic layer comprises a comment that indicates a variable component, rendering the one or more static layers of the file, receiving, from a user device, a request for the video that includes user information, determining, based on the user information, variable definitions designated to be inserted into a dynamic layer, rendering the one or more dynamic layers using the variable definitions, and generating a composite video for playback from the rendered one or more static layers and the rendered one or more dynamic layers.

17 Claims, 4 Drawing Sheets

(51) Int. Cl.
*G06T 15/00* (2011.01)
*H04N 19/46* (2014.01)

(56) References Cited

U.S. PATENT DOCUMENTS

| | | | |
|---|---|---|---|
| 2005/0285875 | A1 | 12/2005 | Kang et al. |
| 2005/0286759 | A1 | 12/2005 | Zitnick et al. |
| 2007/0006064 | A1 | 1/2007 | Colle et al. |
| 2012/0303697 | A1 | 11/2012 | Alstad |
| 2013/0195429 | A1 | 8/2013 | Fay et al. |
| 2015/0294375 | A1* | 10/2015 | Stergiou ............... G06F 16/986 705/14.73 |
| 2015/0346938 | A1* | 12/2015 | Gerhardt ............ G06Q 30/0276 715/723 |
| 2016/0277781 | A1* | 9/2016 | Lennon ............ H04N 21/41407 |
| 2017/0039765 | A1* | 2/2017 | Zhou ..................... G06T 7/521 |
| 2018/0089194 | A1* | 3/2018 | Kalish .............. H04N 21/85406 |
| 2020/0042637 | A1 | 2/2020 | Wu et al. |

FOREIGN PATENT DOCUMENTS

| | | |
|---|---|---|
| CN | 109308729 | 2/2019 |
| CN | 110580163 | 12/2019 |
| EP | 2939424 | 11/2015 |
| JP | 2006-012161 | 1/2006 |
| KR | 10-1980-0414 | 8/2019 |
| KR | 10-2019-0092614 | 8/2019 |

OTHER PUBLICATIONS

Office Action in Korean Appln. No. 10-2021-7021523, dated Sep. 21, 2022, 13 pages (with English translation).
Office Action in Japanese Appln. No. 2021-539667, dated Sep. 20, 2022, 9 pages (with English translation).
Frey [online], "17062018 191627 nfrey," YouTube.com, Jun. 18, 2018, retrieved on Jun. 23, 2021, <https://www.youtube.com/watch?v=CpkMg7HfWKU&feature=youtu.be>, 1 page [Video Submission].
Frey [online], "18062018 000610 nfrey," YouTube.com, Jun. 18, 2018, retrieved on Jun. 23, 2021, <https://www.youtube.com/watch?v=hGyo21w-pno&feature=youtu.be>, 1 page [Video Submission].
Frey [online], "Somoni Monument," YouTube.com, Apr. 25, 2018, retrieved on Jun. 23, 2021, <https://www.youtube.com/watch?v=iSjyqsTo9wQ&feature=youtu.be>, 1 page [Video Submission].
NewBluefx.com [online], "Export After Effects designs to Titler Live," Oct. 30, 2018, retrieved on Jun. 23, 2021, retrieved from URL<https://newbluefx.zendesk.com/hc/en-us/articles/360018863051-Export-After-Effects-designs-to-Titler-Live>, 5 pages.
PCT International Search Report and Written Opinion in International Appln. No. PCT/US2020/032889, dated Dec. 18, 2020, 15 pages.
Vyond.com [online], "Advanced animation with Vyond and Adobe," Jul. 22, 2019, retrieved on Jun. 23, 2021, retrieved from URL<https://www.vyond.com/resources/advanced-animation-vyond-and-adobe/>, 8 pages.
Office Action in European Appln. No. 20731266.1, mailed on Jul. 25, 2023, 5 pages.
Notice of Allowance in Korean Appln. No. 10-2021-7021523, dated Mar. 14, 2023, 4 pages (with English translation).
Office Action in Chinese Appln. No. 202080008316.9, dated Feb. 11, 2023, 19 pages (with English translation).
Notice of Allowance in Japanese Appln. No. 2021-539667, dated Feb. 20, 2023, 5 pages (with English translation).
Office Action in Chinese Appln. No. 202080008316.9, dated Aug. 4, 2023, 11 pages (with English translation).
Office Action in Chinese Appln. No. 202080008316.9, mailed on Nov. 29, 2023, 21 pages (with English translation).
Notice of Allowance in Chinese Appln. No. 202080008316.9, mailed on Jul. 2, 2024, 6 pages (with English translation).

* cited by examiner

EFFICIENTLY RENDERING VIDEO HAVING DYNAMIC COMPONENTS

CROSS-REFERENCE TO RELATED APPLICATION

This application is a National Stage Application under 35 U.S.C. § 371 and claims the benefit of International Application No. PCT/US2020/032889, filed May 14, 2020. The disclosure of the foregoing application is hereby incorporated by reference in its entirety.

BACKGROUND

This document relates to a method for efficiently rendering videos having dynamic components.

SUMMARY

In general, one innovative aspect of the subject matter described in this specification may be embodied in a method for efficiently rendering videos having dynamic components. The method may include identifying a file for rendering a video comprising one or more static layers and one or more dynamic layers, detecting, based on analyzing one or more fields of the file for rendering a video, the one or more static layers and the one or more dynamic layers, wherein each dynamic layer comprises a comment that indicates a variable component, rendering the one or more static layers of the file, receiving, from a user device, a request for the video that includes user information, determining, based on the user information, variable definitions designated to be inserted into a dynamic layer, rendering the one or more dynamic layers using the variable definitions, and generating a composite video for playback from the rendered one or more static layers and the rendered one or more dynamic layers.

These and other embodiments may each optionally include one or more of the following features.

In some implementations, the method includes flattening, using a depth-first traversal algorithm, a document object model of the file for rendering the video. The method can include generating, based on the rendered one or more static layers, a template that indicates the one or more static layers and the one or more dynamic layers. Rendering the one or more dynamic layers using the variable definitions can include populating, using the variable definitions, the template.

In some implementations, the file includes one or more frames, and rendering the one or more static layers of the file includes for each layer of the one or more static layers, saving an image of each frame.

In some implementations, generating a composite video for playback from the rendered one or more static layers and the rendered one or more dynamic layers includes performing an alpha blending operation to combine the rendered one or more static layers and the rendered one or more dynamic layers.

In some implementations, at least one of the one or more dynamic layers comprises at least one of an image representing a logo, text, a video, and a color.

Other embodiments of this aspect may include corresponding systems, apparatus, and computer programs, configured to perform the actions of the methods, encoded on computer storage devices.

Particular embodiments of the subject matter described in this document can be implemented so as to realize one or more of the following advantages. In certain environments, there had previously been no way to dynamically alter a video design such that the design could be customized and rendered for presentation to a user at the time of request at predictable or constant time such that the user experience is not altered. That shortcoming is addressed by the techniques, devices, and systems discussed herein. The techniques described in this document enable a system to use fewer resources and perform fewer operations to generate customized video relevant to a specific application, user, product, or service, among other use cases.

In general, video compositing program rendering times are dependent on the complexity of the video project being rendered. Existing solutions for video editing and compositing require an entire video project to be completely re-rendered in order to make changes to a portion of the video project. These solutions are often time and resource-intensive and cannot be performed at the time of request without causing a requester to incur noticeable delays prior to receiving the edited video.

This new system may support constant rendering times independent of graphical complexity. In other words, the system may dynamically alter and render videos with O(1) time regardless of graphical complexity. The system can, for example, save groups of layers as sequences of images, or static layers. When the system detects a layer that is indicated as a dynamic layer, the system can, for example, save instruction data that indicates the structure of the layer and its position relative to other layers instead of an image. The saved instruction data is used to form dynamic layers. The dynamic layers can be saved in position with the static layers. Because the static layers have been saved as images, the majority of the computational work required at final rendering is compositing, or combining the layers—both static and dynamic—into a single image in the correct z-depth order. This new system is optimized for performing compositing, and thus is able to update dynamic elements of a dynamic layer and perform final rendering at predictable or constant time regardless of graphical complexity.

The system provides an efficient solution that allows customized videos to be delivered with minimal computation at runtime because it is able to reduce the complexity of the operations required when a request for a video is received. By saving the static layers as images, the system performs much of the computationally intensive processing prior to the request and thus reduces the amount of computational resources required to alter and render a video at request time, in turn reducing delays for end users who requested the video.

The system allows video projects to be customized for a particular application, user preferences, and geographical locations, among other factors. In addition to reducing the amount of resources required to customize and render a video for each request, the system reduces the overall amount of resources consumed by allowing a single video project to be adapted and used for different applications and audiences.

Leveraging this method allows for customization of videos that more closely meet user requirements and expectations while conserving resources and reducing video design work that needs to be redone. Further, the improved update process provides efficiencies in content personalization and delivery systems by eliminating the need to re-render portions of a video that will not be dynamically altered or updated. This system provides an avenue for video designers, developers, and content providers to tailor image and video content after the design, editing, and post-processing phases, which require heavy expenditure of resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, systems, and devices that may improve video editing and rendering speed and allow a single video project to be used for multiple applications and to be tailored to different audiences' preferences.

In some implementations, the system allows a completed video project to be altered at the time of request and provided to a requesting user with little to no noticeable delay. A user can, for example, be a video creator who wishes to adapt a video project for a particular client or an end user of a system for content distribution. The system can, for example, receive a video project file from a video compositing program in the form of a composite item. The system can then flatten and process the file to identify layers; determine whether each layer is dynamic or static; and classify and label each layer based on data types contained within the layer. A dynamic layer can include, for example, a variable component to be populated or altered prior to final rendering. After the layers have been classified, the layer data is wrapped in a class to be converted to an object containing all source data needed to render the layer. Consecutive static layers can be wrapped together because these static layers can be outputted together as pre-rendered images, saving storage space and export time. The objects are then exported based on data type to a multi-layer template, pre-rendering the static layers and including the instruction data for dynamic layers. In some implementations, the system performs the pre-rendering of the static layers once for each template. Upon receiving a request for the video associated with the video project file, the system can populate variable portions of the dynamic layers and perform compositing of the pre-rendered static layers and populated dynamic layers to produce a final video to be presented to in response to the request. In some implementations, the system can populate variable portions of the dynamic layers and compositing of the pre-rendered static layers and populated dynamic layers for one or more instantiations of the video, such as different versions of the video.

Figure 1:
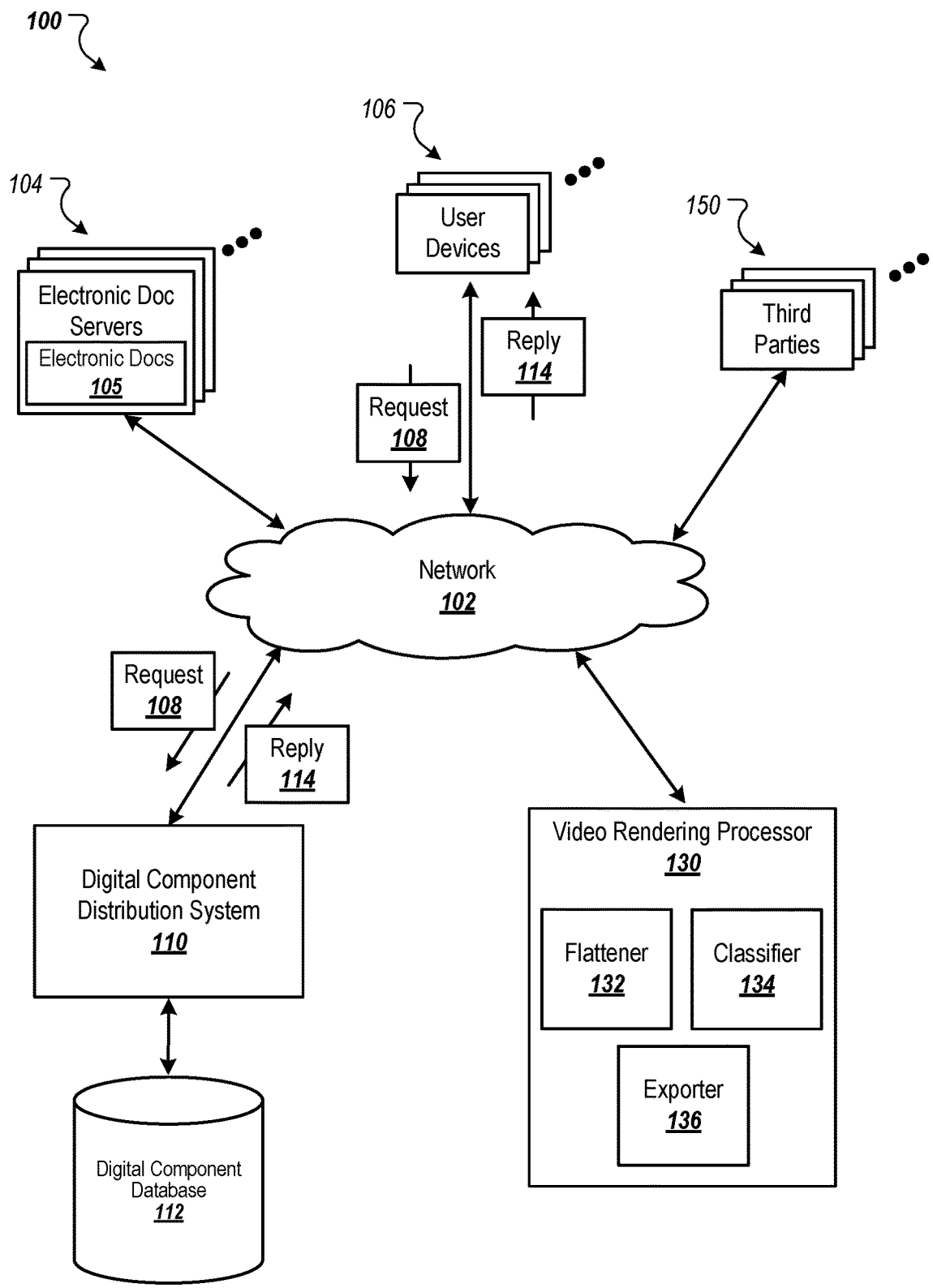
FIG. 1 is a block diagram of an example environment for efficient, dynamic video editing and rendering.

FIG. 1 is a block diagram of an example environment 100 for efficient, dynamic video editing and rendering. The example environment 100 includes a network 102, such as a local area network (LAN), a wide area network (WAN), the Internet, or a combination thereof. The network 102 connects electronic document servers 104 ("Electronic Doc Servers"), user devices 106, and a digital component distribution system 110 (also referred to as DCDS 110). The example environment 100 may include many different electronic document servers 104 and user devices 106.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

One or more third parties 150 include content providers, product designers, product manufacturers, and other parties involved in the design, development, marketing, or distribution of videos, products, and/or services.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Data that specifies characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

In some implementations, digital components from digital component database 112 can include content provided by third parties 150. For example, digital component database 112 can receive, from a third party 150 that uses machine learning and/or artificial intelligence to navigate public streets, a photo of a public intersection. In another example, digital component database 112 can receive, from a third party 150 that provides services to bicycle riders, specific questions to which third party 150 would like responses from users. Additionally, the DCDS 110 can present video content, including content from, for example, video rendering processor 130 and video content provided by video rendering processor 130 stored in the digital component database 112.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

A video compositing program (VCP) 120 allows users to create video project files. Video project files represent a collection of data for rendering a video. In some implementations, video project files are composition items that are each able to be manipulated and provide information about the objects within the item's collection. Composition items can be, for example, items that include several layers with alpha channels alpha blended together. For ease of explanation, VCP 120 is described as a video compositing program, but VCP 120 can also perform digital visual effects, motion graphics, and/or compositing processing. For example, VCP 120 can be a program for post-production processing of videos.

A video rendering processor (VRP) 130 receives video project files from VCP 120 and processes the video project file to detect, label, populate, and render video project file components. VRP 130 includes a flattener 132, a classifier 134, and an exporter 136. Flattener 132 flattens the components, such as layers, of a received video project file. Classifier 134 classifies and labels layers of a received video project file. Exporter 136 determines how to process labeled layers to produce a template file and how to process a template file and one or more altered, or populated, layers for final output.

For ease of explanation, flattener 132, classifier 134, and exporter 136 are shown in FIG. 1 as separate components of VRP 130. VRP 130 can be implemented as a single system on non-transitory computer-readable media. In some implementations, one or more of flattener 132, classifier 134, and exporter 136 can be implemented as integrated components of a single system. VRP 130, its components flattener 132, classifier 134, exporter 136, and their respective outputs are described in further detail below.

Template instantiation system 140 instantiates the template created by VRP 130, populating and/or altering the dynamic layers of the template. In some implementations, template instantiation system 140 can populate and/or alter the dynamic layers of one or more versions of a video, for example, by instantiating one or more templates for each version of the video. In this particular implementation, template instantiation system 140 is shown as separate from VRP 130. Template instantiation system 140 can, for example, receive input that indicates how particular layers should be instantiated. Template instantiation system 140 can receive input from other components of system 100, including user device 106, VCP 120, and third parties 150. In some implementations, template instantiation system 140 includes predetermined values to populate particular layers of a template created by VRP 130. Template instantiation system 140 can determine different values with which to populate a template based on input from, for example, user device 106, VCP 120, and/or third parties 150.

In some implementations, template instantiation system 140 can be integrated with, or a component of, VRP 130. For example, template instantiation system 140 can be a module of VRP 130, and can communicate with the other components of system 100.

Template instantiation system 140 provides the instantiated template to VRP 130 for final rendering and output. For example, template instantiation system 140 can instantiate each of the dynamic layers as objects with the layer's variable components populated. These objects can then be stored in a collection to be passed to VRP 130 for final rendering. In some implementations, template instantiation system 140 can provide the collection as a multi-layer rendering request to VRP 130.

The techniques described below enable a system to efficiently edit and render video, regardless of complexity.

Figure 2:
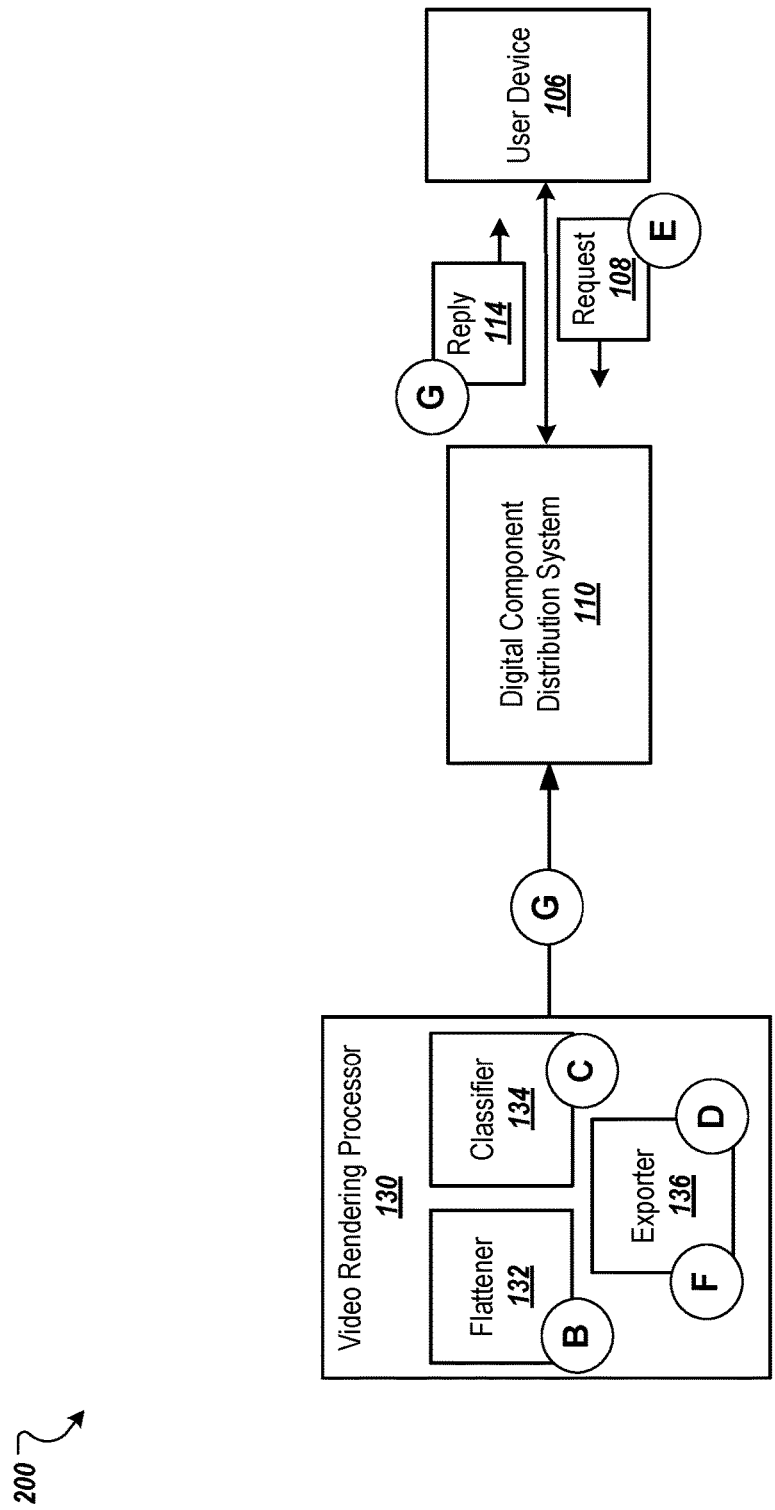
FIG. 2 depicts a data flow of an efficient and dynamic video rendering process.

FIG. 2 shows an example data flow 200 of the efficient, dynamic video editing and rendering process in the example environment of FIG. 1. Operations of data flow 200 are performed by various components of the system 100. For example, operations of data flow 200 can be performed by video rendering processor 130 in communication with DCDS 110, video compositing program 120, template instantiation system 140, and user device 106.

The flow begins with step A, in which VCP 120 provides a video project file 202 to VRP 130. Video project file 202 is an object that represents a composition. For example, video project file 202 can be a CompItem object having an item collection. Video project file 202 can be manipulated and information about the object and its item collection can be obtained. In some implementations, the items in the collection of the video project file 202 can be accessed by position index number in the collection. These items are objects such as video layers, which contain the images, text, audio, and/or objects, among other components, that make up a video.

Video project file 202 can be generated by a user of VCP 120. For example, a video creator or designer can create video project file 202. A user can indicate portions of a video that can be replaced or altered. In some implementations, a user can use a built-in field of VCP 120, such as a comment field, to mark a particular layer as dynamic. For example, a user of VCP 120 can use the comment field of a layer to set a variable "var" to true, thus indicating that at least a portion of the layer can be replaced or altered. In some implementations, the user can indicate a default value, such as the existing layer, to be used if the indicated portion of the layer is not replaced or altered. In some implementations, the user can indicate a set of predetermined values to be used in place of the indicated portion of the layer based on factors such as user preferences, user demographics, location information, and other information received.

The flow continues with step B, in which VRP 130 flattens the document object model (DOM) of video project file 202. The DOM is a cross-platform and language-independent interface that represents documents with a logical tree structure, where each node is an object representing a part of the document. Each branch of the tree ends in a node, and each node contains objects. In some implementations, one of the layers in video project file 202 is a pointer to another composition, providing a point of hierarchy, or depth. Flattener 132 of VRP 130 can iterate across objects in the DOM of video project file 202. For example, flattener 132 of VRP 130 can conduct a depth-first flattening of all layers within the DOM of the video project file 202. A depth-first flattening can be implemented by, for example, selecting a starting node of the DOM of video project file 202 and pushing all of its adjacent nodes into a stack; popping a node from the stack to select the next node to visit and pushing all of that node's adjacent nodes into a stack; and repeating the process until the stack is empty. In some implementations, flattener 132 can iterate across each layer in z-depth order, or in a breadth-wise order. A breadth-wise flattening can be implemented by, for example, using the opposite strategy as a depth-first flattening by starting at the DOM root of video project file 202, and exploring all of the neighbor nodes at the present depth prior to moving on to the nodes at the next depth level.

The flow continues with step C, in which VRP 130 classifies each of the layers of video project file 202 so that an appropriate export module can be identified for later use. In some implementations, step C is performed concurrently with step B, such that VRP 130 classifies layers as they are flattened through a depth-first algorithm. For example, as flattener 132 explores each of the nodes, classifier 134 can detect the particular file format for each detected layer and label the layer such that VRP 130 can select an appropriate export module for rendering the layer.

Classifier 134 can detect whether the layer is a dynamic layer—a layer having a variable component or component that can be altered—or a static layer—a layer that does not have a variable component or component that can be altered. For example, a static layer can be an image such as an image of the sun that remains in the background of a video. In some implementations, a static layer can be a layer that will not change at final rendering. For example, static layers in a video can include all layers that do not have a variable component and can be rendered prior to the time of request. In some implementations, a dynamic layer can be, for example, a 2D or 3D image or video that needs to be placed or moved around a video scene. For example, a dynamic layer can be a business logic image element, such as a rating star (for ratings out of five stars) or a color layer, such as a green background.

In some implementations, classifier 134 can identify whether a layer is a dynamic layer by determining whether a field of the layer has a particular value. Classifier 134 can determine, for example, whether the comment field of a layer contains a particular variable or set of text. In one example, classifier 134 can check whether the value of the statement Layer.comment.contains('var=true') for a particular layer is TRUE to determine if the layer is dynamic.

In addition to determining whether a layer is dynamic or static, classifier 134 can classify and label each layer based on a type of data contained within the layer. These labels can be used to determine an appropriate export module for rendering the layer. For example, classifier 134 can check whether the value of the statement Layer.constructor==AVLayer is TRUE to determine if the layer is a video layer. Video layers can include, for example, audio or image data.

In another example, classifier 134 can check whether the value of the statement Layer.constructor==TextLayer is TRUE to determine if the layer is a text layer. If the layer is a dynamic text layer, for example, characteristics of the layer that can be changed can include the text itself, the placement, the transparency, the size, the color, and the font, among other characteristics. Text layers can include, for example, 2D or 3D text.

In another example, classifier 134 can check whether the value of the statement Layer.source.typeName=='Composition' is TRUE to determine if the layer is a hierarchy node of the DOM. For example, if classifier 134 determines that layer is a hierarchy node, VRP 130 uses this node as a point in the hierarchy of the DOM and uses recursion to continue flattening the DOM of video project file 202 until the entire tree has been traversed.

In another example, classifier 134 can check whether the value of the statement Layer.comment DOES NOT contain ('var=true') is TRUE to determine if the layer is a static layer. A static layer will not change at final rendering, and thus can be treated differently from a dynamic layer. The handling of static and dynamic layers is explained further in the following steps.

The flow continues with step D, in which VRP 130 creates a template using the flattened, classified layers of video project file 202. For example, exporter 136 can create a template that represents the dynamic and static layers of video project file 202. After each layer is classified, exporter 136 can wrap the layer in a queued class. For example, exporter 136 can wrap a layer in a class that contains all source materials needed to render the layer. These items can be stored in a queue to be exported to a template. In some implementations, after the layer is wrapped in the class and an item of that class is instantiated, no additional references to video project file 202 are made. This format allows VRP 130 to reduce the number of references and accesses to video project file 202, thus reducing the amount of computing resources necessary to render the video.

In some implementations, more than one static layer can be wrapped into a single item of the class. For example, consecutive static layers in z-depth order, or other appropriate ordering schemes, can be exported out to a template together as pre-rendered images. For example, exporter 136 can render out three consecutive static layers in z-depth order as a single PNG. In some implementations, exporter 136 can identify a sequence of static layers to be exported as a single image. Exporter 136 can, for example, begin a sequence when a static layer is detected and end a sequence when it detects a dynamic layer, such that the sequence does not include the dynamic layer. By exporting multiple static layers at once, exporter 136 reduces the amount of storage resources required to save the static layers and reduces the amount of time that the final rendering process takes.

In some implementations, other types will include only one layer. For example, only one dynamic layer may be wrapped into a single item of the class. Items of the class containing dynamic layers can include information such as the portion of the layer that is variable and instructions regarding the structure of the item, among other information.

In some implementations, exporter 136 handles the storage of the queued items, exports the items into an output format to create a template, and when a template is instantiated, exporter 136 populates the template and saves the populated template to disk. For example, exporter 136 can save the template itself as a protocol buffer object in a JavaScript Object Notation (JSON) format. The protocol buffer object, or message, can reference saved source material using relative paths.

After the template is instantiated, exporter 136 populates the template variables with properties of video project file 202. For example, exporter 136 can populate an instantiated template with video parameters from video project file 202. Exporter 136 uses transform libraries to populate the template with parameters.

Transforms allow for time-varying adjustments of a layer. One or more transforms can be applied to any given frame within a layer. For example, exporter 136 can apply transforms such as position, transparency, mask, blur, and texture transformations. For example, exporter 136 can perform mask transforms using image sequences. In another example, exporter 136 can perform a transform that computes the position of an object. Exporter 136 can, for example, use a library that computes the 2D projective image position of an object in each frame by placing and locking a type of null element onto the corners of each element and adding different type of null element to the corner of each of the null elements. For example, exporter 136 can place and lock a null 3D element onto the corners of each element and add a 2D null to the corner of each of the 3D elements. In some implementations, exporter 136 can use existing libraries from programs such as VCP 120.

A group of transformations for each frame provides all necessary data to adjust an object within that frame. The transforms are self-contained within a given frame such that no keyframes are needed, and forward-looking and backward-looking extrapolation is not required, allowing for parallelization. Exporter 136 can, for example, perform all frame transformations in parallel to reduce processing time. Transforms share a start time, end time, and timestamp on each frame. Exporter 136 reduces the amount of storage resources required by using only one of these values, allowing the other two values to be used for error detection and correction. For example, exporter 136 can use a timestamp to apply a transparency transformation to a particular frame and can use a start time to verify that no errors are contained in the temporal properties of the transparency transformation.

Exporter 136 includes an export module for each type of layer. Based on the classification by the VRS, exporter 136 can select and use a particular export module to produce an appropriate output. The export modules can, for example, operate similarly to the export modules of VCP 120.

Exporter 136 includes a static layer export module, media layer export module, and text layer export module, among other types of export modules.

The static layer export module of exporter 136 receives layers that have been classified as static and outputs a protocol buffer message designated as a static layer message. The static layer export module outputs a protocol buffer message from one or more static layers. For example, the static layer export module can receive six static layers and output a protocol buffer message representing the six static layers. The static layer export module can output all static layers of a video project file 202. In some implementations, the static layers must be consecutive. The static layer export module can export static layers by, for example, disabling all layers of video project file 202 that have been classified as a type other than a static layer, enabling all layers of video project file 202 that have been classified as a static layer, and calling a saved image for each frame. In some implementations, the static layer export module of exporter 136 pre-renders all static layers of video project file 202 by calling saved images for each frame because these frames will not change at final rendering, thus reducing the amount of processing that needs to be done at final rendering to complete the video.

The media layer export module of exporter 136 receives layers that have been classified as dynamic media layers and outputs a protocol buffer message designated as a dynamic media layer message. Dynamic media layers include images and videos. For example, the dynamic media layer export module can receive a layer including an image that is variable and can be replaced and export a protocol buffer message indicating the dynamic media layer. Dynamic media layers can include, for example, images such as logos and photos, videos such as video logos, product clips, messages from a spokesperson, visual elements such as colors and textures, and text such as taglines, slogans, or names, among other objects.

When the template is instantiated, the media layer export module populates the template variables with properties of video project file 202. For example, the media layer export module can populate side and position properties of the template variables for a particular dynamic media layer using a library from VCP 120.

The flow continues with step E, in which the DCDS 110 receives a request 108 for content from user device 106. Request 108 is transmitted by user device 106 to DCDS 110 when the client device interacts with digital content. For example, if a user of user device 106 clicks a link to download a shopping application, the link can cause user device 106 to transmit a request 108 to DCDS 110. The request 108 can include interaction tracking data from the client device 106. For example, the request 108 can include tracking data such as an indication of the interaction, the digital content with which user device 106 interacted, and an identifier that uniquely identifies user device 106. In some implementations, the request 108 includes an indication of the provider of the digital content and the location of the destination server that hosts the requested resource.

The DCDS 110 processes the request and forwards a request for a particular video, including customization information, to template instantiation system 140. For example, the DCDS 110 can select a particular video using the content selection process described above with respect to FIG. 1 and determine personalization information for template instantiation system 140. In some implementations, the DCDS 110 determines personalization information based on user information for the user of user device 106. In some implementations, the DCDS 110 determines personalization information based on information from, for example, a third party 140 that provides content to the DCDS 110.

In some implementations, step E does not occur in data flow 200, and a user of VCP 120, VRP 130, or user device 106 can provide a request for an altered video directly to template instantiation system 140.

The flow continues with step F, in which template instantiation system 140 instantiates the template, providing variable definitions, or instructions, regarding how to populate variable portions of the template, and exporter 136 populates the variables. In some implementations, variable definitions include data that define particular variables within a template. For example, template instantiation system 140 instantiates the template with instructions regarding the population of variable components of the dynamic layers, generating a multi-layer request. Template instantiation system 140 then provides the multi-layer request to exporter 136.

Exporter 136 receives the multi-layer request and uses the pre-rendered static layers in the form of static layer protocol buffer messages and the instructions provided by template instantiation system 140 in the multi-layer request to perform final rendering of the video. Because the static layers were pre-rendered when the template for video project file 202 was generate, the final rendering operations performed at the time of request include only the population of the variables and the compositing of the layers. For example, exporter 136 can perform alpha blending of the images in static layer protocol buffer messages and the populated dynamic layers to produce the final rendering of video project file 202. These operations are optimized in VRP 130 such that the rendering time is O(1) at the time of request for videos of varying levels of graphical complexity, because the static layers were pre-rendered when the template was generated. Thus, the system 100 and the process 200 as performed by system 100 provides a technical improvement over existing video altering and rendering solutions.

The flow continues with step G, in which VRP 130 provides the rendered video to DCDS 110 for presentation to user device 106 along with, or as reply 114. As described above, reply data 114 can indicate the video content as rendered by VRP 130 in addition the requested electronic document. Reply data 114 is transmitted by DCDS 110 to user device 106 in response to DCDS 110 receiving request 108 and determining, based on the received distribution parameters and user data indicated in request 108, that the distribution parameters are satisfied.

Figure 3:
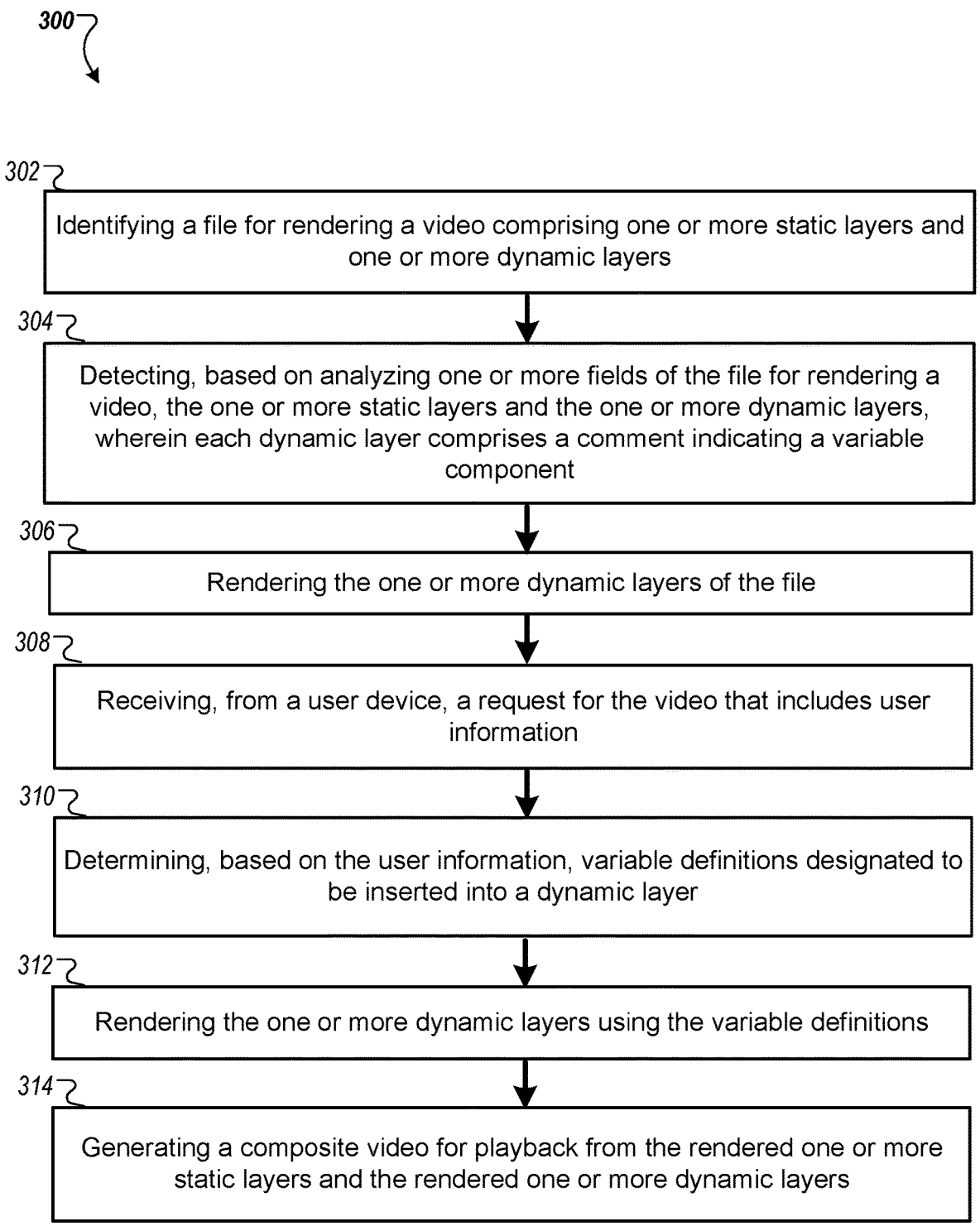
FIG. 3 is a flow chart of an example process for efficient, dynamic video editing and rendering.

FIG. 3 is a flow chart of an example process 300 for efficiently and dynamically altering and rendering video. In some implementations, process 300 can be performed by one or more systems. For example, process 300 can be implemented by VRP 130, DCDS 110, user device 106, and/or third party 140 of FIGS. 1-2. In some implementations, the process 300 can be implemented as instructions stored on a non-transitory computer readable medium, and when the instructions are executed by one or more servers, the instructions can cause the one or more servers to perform operations of the process 300.

Process 300 begins with identifying a file for rendering a video comprising one or more static layers and one or more dynamic layers (302). For example, VRP 130 can receive or identify a video project file 202 for rendering a video generated by VCP 120. Video project file 202 can contain one or more static layers and one or more dynamic layers. In some implementations, VCP 120 provides video project file 202 to VRP 130. In some implementations, VRP 130 can retrieve video project file 202 from a storage device.

Process 300 continues with detecting, based on analyzing one or more fields of the file for rendering a video, the one or more static layers and the one or more dynamic layers, wherein each dynamic layer comprises a comment indicating a variable component (304). For example, flattener 132 of VRP 130 can flatten the DOM of video project file 202. Concurrently, classifier 134 of VRP 130 can analyze one or more fields of video project file 202 to detect, for example, comment fields that indicate whether a particular layer is static or dynamic, or variable.

Process 300 continues by rendering the one or more static layers of the file (306). For example, exporter 136 can wrap and export the layers into protocol buffer messages. Exporter 136 generates a template that includes variables for dynamic layers and pre-rendered static layers. For example, exporter 136 can pre-render each of the static layers by calling saved images of frames of static layers and exporting those saved images. The rendering of the one or more static layers of the file occurs prior to the time of request, or receipt of a request for the video that includes user information, such that the static layers are pre-rendered and reduces the amount of rendering that must be done at the time of request.

Process 300 continues with receiving, from a user device, a request for the video that includes user information (308). For example, the DCDS 110 can receive a request 108 from a user of user device 106 and forward the request to template instantiation system 140.

Process 300 continues with determining, based on the user information, variable definitions designated to be inserted into a dynamic layer (310). For example, template instantiation system 140 can determine, based on the user information provided in the request forwarded by the DCDS 110, instructions for altering or replacing variables of the dynamic layers. Template instantiation system 140 can then instantiate the template generated by exporter 136.

Process 300 continues with rendering the one or more dynamic layers using the variable definitions (312). For example, exporter 136 of VRP 130 can populate the template instantiated by template instantiation system 140 based on the instructions for altering or replacing variables of the dynamic layers provided by template instantiation system 140.

Process 300 concludes with generating a composite video for playback from the rendered one or more static layers and the rendered one or more dynamic layers (314). For example, exporter 136 of VRP 130 can perform the final rendering of the video of video project file 202 using the populated template to produce a video for playback. Because the template includes a pre-rendering of the static layers, a relatively significant amount of the final rendering process is alpha blending the layers together, and additional processing time from populating the template does not constitute a significant proportion of the final rendering process. Thus, the system 100 provides an efficient solution for altering and dynamically rendering videos of varying graphical complexity at constant time.

Figure 4:
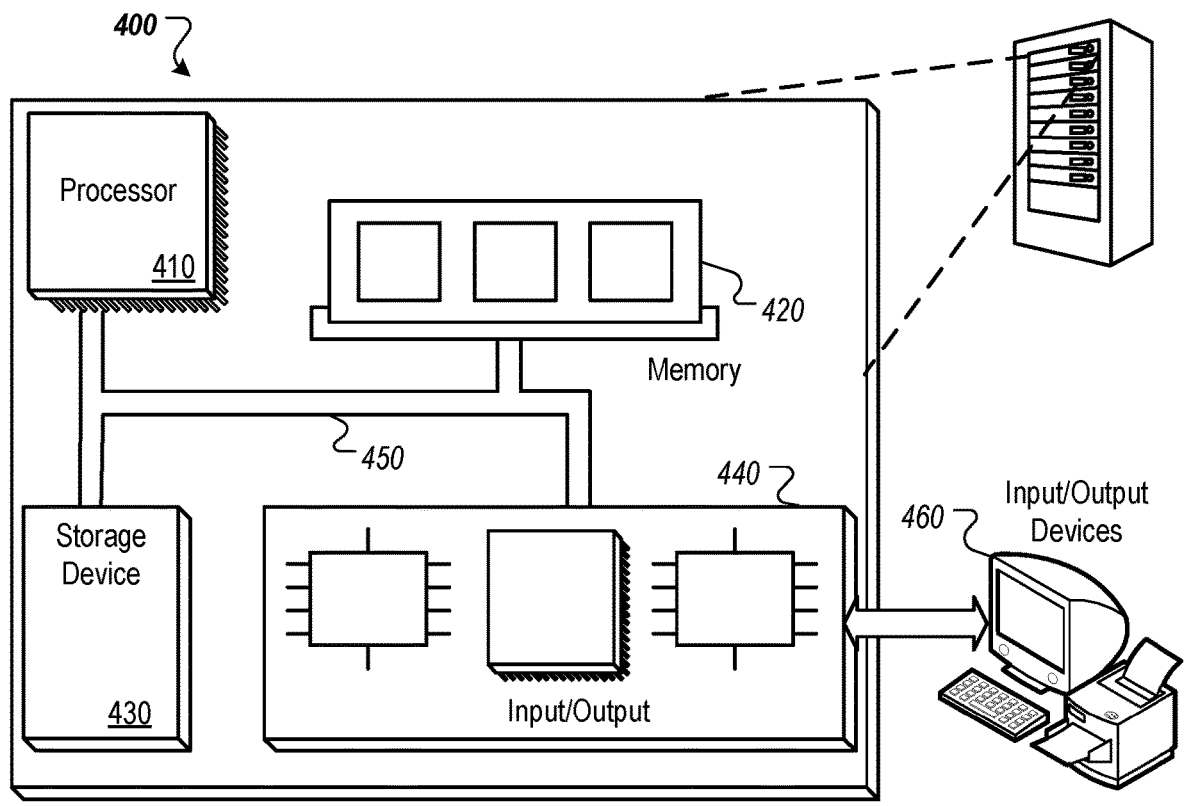
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for efficient dynamic video rendering comprising:
    identifying a file for rendering a video comprising one or more static layers and one or more dynamic layers, wherein each dynamic layer comprises a variable component to be populated or altered prior to final rendering;
    detecting, based on analyzing one or more fields of the file for rendering a video, the one or more static layers and the one or more dynamic layers, wherein each dynamic layer comprises a comment in a comment field for the dynamic layer that indicates a variable component, wherein the comment is provided in the comment field by a user, and wherein the detecting comprises detecting that a particular layer of the file is a dynamic layer based on a comment in the comment field for the particular layer;
    rendering the one or more static layers of the file, the rendering comprising saving the static layers as images;
    for each dynamic layer, saving instruction data that indicates the structure of the dynamic layer in a respective position with the static layers;
    generating, based on the rendered one or more static layers and the instruction data for each dynamic layer, a template that represents the one or more static layers and the one or more dynamic layers;
    after rendering the one or more static layers, receiving, from multiple user devices, respective requests for the video, wherein each request includes contextual data that characterizes an environment in which the video will be displayed at the user device from which the request was received, the contextual data comprising user information for a user of the user device from which the request was received and device information about the user device from which the request was received;
    for each request:
        for each dynamic layer, determining, based on the contextual data of the request and variable definitions comprising instructions for replacing or altering the variable component of the dynamic layer based on the contextual data of the request, an image for replacing the variable component or an alteration of the image;
        rendering the one or more dynamic layers by populating the template using the variable definitions and the determined image or alteration to the image for each dynamic layer; and
        generating a composite video for playback from the rendered one or more static layers and the rendered one or more dynamic layers, including, for each frame of the video, compositing rendered images of each layer of the frame, wherein the composite video for each request differs from the composite video for each other request.

2. The method of claim 1, further comprising flattening, using a depth-first traversal algorithm, a document object model of the file for rendering the video.

3. The method of claim 1, wherein the file comprises one or more frames; and wherein rendering the one or more static layers of the file comprises, for each layer of the one or more static layers, saving an image of each frame.

4. The method of claim 1, wherein generating a composite video for playback from the rendered one or more static layers and the rendered one or more dynamic layers comprises performing an alpha blending operation to combine the rendered one or more static layers and the rendered one or more dynamic layers.

5. The method of claim 1, wherein at least one of the one or more dynamic layers comprises at least one of an image, text, a video, a texture, and a color.

6. The method of claim 1, wherein generating, based on the rendered one or more static layers and the instruction data for each dynamic layer, a template that represents the one or more static layers and the one or more dynamic layers comprises:
    classifying each layer of the one or more static layers and the one or more dynamic layers; and
    wrapping each layer in a queued class, comprising one or more source materials for rendering the layer.

7. The method of claim 6, wherein each of the one or more source materials comprises one or more static layers.

8. The method of claim 1, wherein rendering the one or more static layers of the file comprises:
    identifying two or more consecutive static layers in z-depth order from the one or more static layers; and
    saving the two more consecutive static layers as a single image.

9. A system comprising:
one or more processors; and
one or more memory elements including instructions that, when executed, cause the one or more processors to perform operations including:
    identifying a file for rendering a video comprising one or more static layers and one or more dynamic layers, wherein each dynamic layer comprises a variable component to be populated or altered prior to final rendering;
    detecting, based on analyzing one or more fields of the file for rendering a video, the one or more static layers and the one or more dynamic layers, wherein each dynamic layer comprises a comment in a comment field for the dynamic layer that indicates a variable component, wherein the comment is provided in the comment field by a user, and wherein the detecting comprises detecting that a particular layer of the file is a dynamic layer based on a comment in the comment field for the particular layer;

rendering the one or more static layers of the file, the rendering comprising saving the static layers as images;

for each dynamic layer, saving instruction data that indicates the structure of the dynamic layer in a respective position with the static layers;

generating, based on the rendered one or more static layers and the instruction data for each dynamic layer, a template that represents the one or more static layers and the one or more dynamic layers;

after rendering the one or more static layers, receiving, from multiple user devices, respective requests for the video, wherein each request includes contextual data that characterizes an environment in which the video will be displayed at the user device from which the request was received, the contextual data comprising user information for a user of the user device from which the request was received and device information about the user device from which the request was received;

for each request:
  for each dynamic layer, determining, based on the contextual data of the request and variable definitions comprising instructions for replacing or altering the variable component of the dynamic layer based on the contextual data of the request, an image for replacing the variable component or an alteration of the image;
  rendering the one or more dynamic layers by populating the template using the variable definitions and the determined image or alteration to the image for each dynamic layer; and
  generating a composite video for playback from the rendered one or more static layers and the rendered one or more dynamic layers, including, for each frame of the video, compositing rendered images of each layer of the frame, wherein the composite video for each request differs from the composite video for each other request.

10. The system of claim 9, the operations further comprising flattening, using a depth-first traversal algorithm, a document object model of the file for rendering the video.

11. The system of claim 9, wherein the file comprises one or more frames; and
  wherein rendering the one or more static layers of the file comprises, for each layer of the one or more static layers, saving an image of each frame.

12. The system of claim 9, wherein generating a composite video for playback from the rendered one or more static layers and the rendered one or more dynamic layers comprises performing an alpha blending operation to combine the rendered one or more static layers and the rendered one or more dynamic layers.

13. The system of claim 9, wherein at least one of the one or more dynamic layers comprises at least one of an image, text, a video, a texture, and a color.

14. A non-transitory computer storage medium encoded with instructions that when executed by a distributed computing system cause the distributed computing system to perform operations comprising:
  identifying a file for rendering a video comprising one or more static layers and one or more dynamic layers, wherein each dynamic layer comprises a variable component to be populated or altered prior to final rendering;

detecting, based on analyzing one or more fields of the file for rendering a video, the one or more static layers and the one or more dynamic layers, wherein each dynamic layer comprises a comment in a comment field for the dynamic layer that indicates a variable component, wherein the comment is provided in the comment field by a user, and wherein the detecting comprises detecting that a particular layer of the file is a dynamic layer based on a comment in the comment field for the particular layer;

rendering the one or more static layers of the file, the rendering comprising saving the static layers as images;

for each dynamic layer, saving instruction data that indicates the structure of the dynamic layer in a respective position with the static layers;

generating, based on the rendered one or more static layers and the instruction data for each dynamic layer, a template that represents the one or more static layers and the one or more dynamic layers;

after rendering the one or more static layers, receiving, from multiple user devices, respective requests for the video, wherein each request includes contextual data that characterizes an environment in which the video will be displayed at the user device from which the request was received, the contextual data comprising user information for a user of the user device from which the request was received and device information about the user device from which the request was received;

for each request:
    for each dynamic layer, determining, based on the contextual data of the request and variable definitions comprising instructions for replacing or altering the variable component of the dynamic layer based on the contextual data of the request, an image for replacing the variable component or an alteration of the image;
    rendering the one or more dynamic layers by populating the template using the variable definitions and the determined image or alteration to the image for each dynamic layer; and
    generating a composite video for playback from the rendered one or more static layers and the rendered one or more dynamic layers including, for each frame of the video, compositing rendered images of each layer of the frame, wherein the composite video for each request differs from the composite video for each other request.

15. The non-transitory computer storage medium of claim 14, the operations further comprising flattening, using a depth-first traversal algorithm, a document object model of the file for rendering the video.

16. The non-transitory computer storage medium of claim 14, wherein the file comprises one or more frames; and wherein rendering the one or more static layers of the file comprises, for each layer of the one or more static layers, saving an image of each frame.

17. The non-transitory computer storage medium of claim 14, wherein generating a composite video for playback from the rendered one or more static layers and the rendered one or more dynamic layers comprises performing an alpha blending operation to combine the rendered one or more static layers and the rendered one or more dynamic layers.

* * * * *